United States Patent Office 3,425,125
Patented Feb. 4, 1969

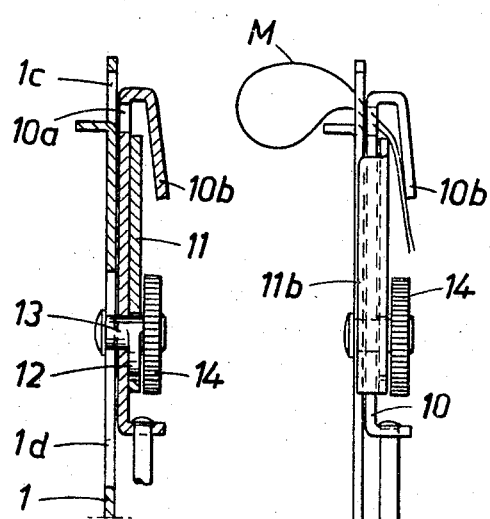
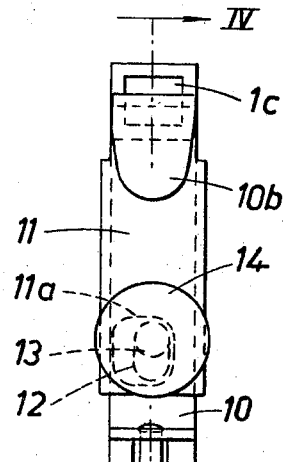
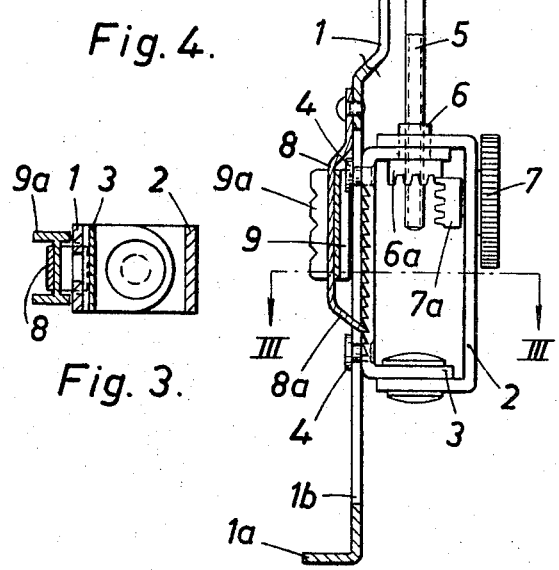
Fig. 4.
Fig. 3.
Fig. 1.
Fig. 2.

3,425,125
DENTAL RETAINERS
Gunnar Bergendal, Angbyhojden 42, Bromma, near Stockholm, Sweden
Filed May 10, 1966, Ser. No. 548,907
Claims priority, application Sweden, May 19, 1965, 6,539/65
U.S. Cl. 32—63     3 Claims
Int. Cl. A61c 5/12

ABSTRACT OF THE DISCLOSURE

A dental retainer for placing a flexible band as a filling matrix around a tooth. The band is looped around a tooth and the ends of the band are then clamped. The band is tightened by manual longitudinal movement of a carriage and screw spindle connected to a band holder. Further tightening is effected by advancement of the screw spindle through an angular gear device and a control knob having its axis of rotation angularly disposed in relation to the longitudinal axis of the spindle and the band holder.

---

The invention relates to matrix retainers for tooth fillings, viz a holder for placing a flexible band as a filling matrix around a tooth to be provided with a filling, usually of amalgam.

In their general arrangement such dental retainers comprise an oblong frame with a slidable holder on its front end portion for clamping the ends of a matrix band loop, inserted through recesses in the frame and in said band holder, as well as a screw spindle extending along the frame, the front end of said spindle being mounted in the band holder and the rear end of said spindle being connected with control means for rotary and longitudinal movement of said spindle.

In a well-known dental retainer of this type, generally in use, the front end of the spindle is screwed into the band holder, a rotation of the spindle by means of a knob on the rear end of the spindle causing a clamping of the ends of the band as these are pressed by the front end of the spindle against the front edge of the recess made in the band holder. Then, the tightening of the matrix band around the tooth is effected by sliding the entire band holder backwards along the flat frame, this sliding movement being performed by the dentist turning a nut on the spindle, said nut being held in the frame against longitudinal movement in the same.

Dental retainers of this well-known construction have the disadvantage that they especially during the last hard tightening of the matrix band around the tooth tend to transfer bending or breaking stresses to the tooth, and therefore the dentist has to hold the retainer firmly by one hand, but this is connected with difficulties when the dentist is working deep in the mouth. Moreover, these retainers have the disadvantage that the movement of the band holder backwards along the frame for tightening the matrix band around the tooth is rather time-consuming, especially when the matrix band loop is large, and this is due to the fact that the tightening is effected by feeding the fine-threaded spindle backwards by means of the nut which is held in the frame against longitudinal movement in the same.

An object of the invention is to create a matrix band retainer such that not even the last hard tightening of the matrix band loop around the tooth involves any rotation of the retainer proper, which then easily can be held at the rear end of the frame, and another object is to create a matrix band retainer such that the longitudinal movement of the band holder backwards along the frame for tightening the matrix band loop around the tooth can be performed rapidly.

The essential features of the invention are claimed in the appendant claims and one embodiment of a matrix band holder according to the invention is by way of example illustrated in the accompanying drawing, in which:

FIG. 1 is a side view of the dental retainer according to the invention, in part in a longitudinal cross section through the rear end portion of the frame, said rear end directed downwards in said figure;

FIG. 2 is a plan view corresponding to FIG. 1 and seen from the right in the same;

FIG. 3 is a transversal cross section taken along the line III—III in FIG. 1;

FIG. 4 is a longitudinal cross section through the front portion of the frame, along the line IV—IV in FIG. 2.

In the drawing, the reference numeral 1 indicates the frame of the dental retainer, which is made as a sheet metal bar, having its rear end 1a (downwards in FIGS. 1 and 2) bent for constituting a grip member or handle. The rear portion of the frame is stepwise lowered in relation to the front portion, as shown in FIG. 1, and supports a gear holder in the form of a slidable carriage, which consists of two interconnected sheet metal strips 2, 3, which are bent in the form of an U and are facing each other. By means of two pins 4 said carriage is slidably guided in a longitudinal slot 1b in the rear portion of the frame. In the front end wall of the carriage 2, 3 a nut 6 on the threaded rear portion of the screw spindle 5 is rotatably mounted. This nut is made as a sleeve, which extends through said end wall and which at the inner side of said end wall is provided with a gear ring or toothed ring 6a. In the upper side of the carriage 2, 3 (to the right in FIG. 1), a control knob 7 is rotatably mounted with an axis of rotation at right angles to the spindle, the journal of said knob being provided with a gear ring or toothed ring 7a, meshing with the ring 6a. Thus, a fine or slow motion of the spindle 5 to and fro can be effected by means of the angular gear 6a, 7a.

At the bottom side of the rear portion of the frame (to the left in FIG. 1) a spring catch 8 for the carriage 2, 3 is provided. This spring catch comprises a spring leaf 8, having its front end attached to the frame, whereas its rear portion forms a space against the bottom side of the frame, and its rear end 8a is bent upwards and projects obliquely through a wider section of the slot 1b into engagement with a toothing, made in the bottom surface of the carriage 2, 3 and having its teeth inclined in the forward direction. Thus, the carriage 2, 3 together with the spindle 5 is freely slidable backwards, but a movement forwards is automatically prevented by the spring catch. For allowing a free movement of the carriage 2, 3 forwards, a manually actuated releaser 9 is provided for disengaging the spring catch by hand. This releaser consists of a slidable piece 9 which is disposed in the space between the spring leaf 8 and the bottom side of the frame and which when moved backwards is camming the slanting end portion 8a from the engagement with the toothing in the bottom side of the carriage. The slidable piece 9 has guiding flanges 9a at both sides of the spring leaf 8, said flanges having knurled edges for facilitating the manual operation of the same.

On the front portion of the frame (upwards in FIGS. 1 and 2), the band holder 10 is mounted, which is made as an oblong plate and is slidably guided along the frame, the front end of the spindle 5 being secured in the rear end of the band holder, said rear end being bent upwards. The frame has a recess 1c adjacent to the front end, said recess allowing the insertion of the two combined ends of a matrix band M bent to the form of a loop, and the band holder 10 has also a recess 10a adjacent to the front end for inserting said band ends. The front end of the band holder 10 is bent upwards and backwards. On the band holder 10, a locking plate 11 is guided for movement in the longitudinal direction, and this locking plate is operated by means of an eccentric 12 having a journal 13 extending at right angles through a longitudinal slot 1d in the frame, whereby the band holder 10 is longitudinally guided in relation to the frame. The eccentric 12 is made as an oblong body (see FIG. 2) and can be rotated not more than half a revolution in a recess 11a which is provided in the locking plate 11 and has the form of a square having a side of a length somewhat larger than the length of the eccentric body 12. The journal 13 supports on the upper side of the locking plate 11 a control knob 14, which when rotated moves the locking plate 11 longitudinally to and fro in relation to the band holder 10 to an extent corresponding to the eccentricity. The guiding of the locking plate 11 is effected by the longitudinal edges 11b of the same, which are bent downwards at both sides of the frame, in the front position of the locking plate 11, the ends of the matrix band are clamped against the bent front edge of the band holder 10.

The matrix band retainer as described is used and functions in the following manner.

The attachment of the ends of the matrix band in the slidable band holder 10 is effected by means of the locking plate 11 and the eccentric lock 12, which is independent of the screw spindle 5 and the control means for the same, provided in the carriage. This clamping of the ends of the matrix band can be performed very rapidly in comparison with the previously utilized clamping by screwing the front end of the spindle forwards. A first coarse tightening of the matrix band loop around the tooth can be performed very rapidly by gripping the retainer with the thumb behind the grip member 1a and the forefinger in front of the front end wall of the carriage 2, 3. After this rapid movement of the carriage 2, 3 and the band holder 10 backwards until the matrix band lies tightly around the tooth, the carriage 2, 3 is locked automatically in the retracted position by means of the spring catch 8. Then a hard tightening of the matrix band around the tooth is effected by moving the spindle 5 and thereby the band holder 10 a further small extent by means of the angular gear 6a, 7a and the control knob 7. Under none of these movements, is the retainer proper subjected to any tendency to rotate. For removing the retainer one has to move the releaser 9 backwards, whereby the carriage 2, 3 can be moved freely forwards, so that the loop of the matrix band is widened and can be taken away from the tooth. By manipulating the eccentric lock the dentist can easily loosen the matrix band from the band holder 10.

Thus it is to be understood that the carriage 2, 3 renders it possible to tighten and release the matrix band loop very rapidly and that it is only the very last tightening of the band loop around the tooth that has to be performed by a screw operation of the band holder 10.

Also, the utilization of the separate eccentric lock with the clamping plate makes it possible to attach and release the ends of the matrix band very easily and rapidly.

The invention is not restricted to the embodiments illustrated and described, many modifications being possible within the scope of the appendant claims.

I claim:

1. A dental retainer for placing a flexible band as a filling matrix around a tooth, said retainer comprising an oblong frame with a sliding band holder on its front end portion said frame and holder having recesses through which extend the ends of a matrix band loop, and a screw spindle extending along the frame, the front end of said spindle being mounted in the band holder and the rear end of said spindle being connected with control means, the improvement which comprises:

means for clamping the ends of the matrix band loop and wherein said control means includes a gear holder mounted on the rear portion of the frame the rear end of the spindle being rotatably mounted in said gear holder, said gear holder being adapted to be urged manually rearwardly for moving said spindle and the band holder an initial distance longitudinally with respect to the frame; and angular gear means including a control knob operatively connected therewith, rotatably mounted in the gear holder and having its axis of rotation angularly disposed in relation to the longitudinal direction of the frame for advancing the spindle relative to the gear holder to move the band holder a final distance thereby tightening the flexible band around a tooth.

2. A dental retainer according to claim 1, wherein the gear holder is a longitudinally guided carriage on the rear portion of the frame, and which further includes, a spring catch on the rear portion of the frame for engaging the carriage, said spring catch allowing a free sliding movement of the carriage with the spindle backwards but automatically blocking a sliding movement of the carriage forwards, and a releaser for manually disengaging the spring catch for alowing a free sliding movement of the carriage in the forward direction.

3. A dental retainer according to claim 1, in which said clamping means includes, a locking plate which is longitudinally guided on the band holder and which is movable relative the band holder to and fro a position for clamping the band ends in the band holder; and an eccentric having a rotatable control knob for effecting the movement of the locking plate, said control knob having its axis of rotation at right angles to the locking plate.

References Cited

UNITED STATES PATENTS 2,617,196   11/1952   Reiter _____ 32—63

ROBERT PESHOCK, *Primary Examiner.*